Jan. 2, 1951     C. E. LANG ET AL     2,536,507
AGRICULTURAL PICKER AND ASSORTER
Filed Jan. 21, 1947     2 Sheets-Sheet 2
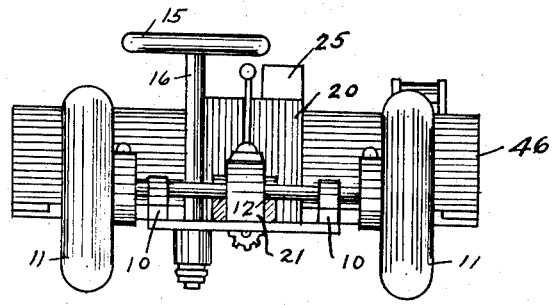
FIG. 4
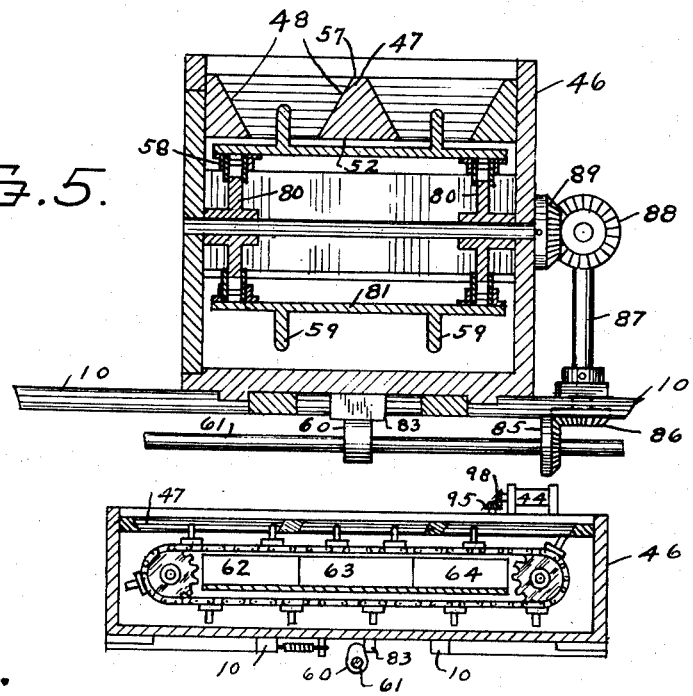
FIG. 5.
FIG. 3.
Inventors
CHARLES EDWIN LANG.
ALBERT KARNEMAAT.
JOHN JANSMA.
BY Howard J. Whelan,
Attorney Patented Jan. 2, 1951

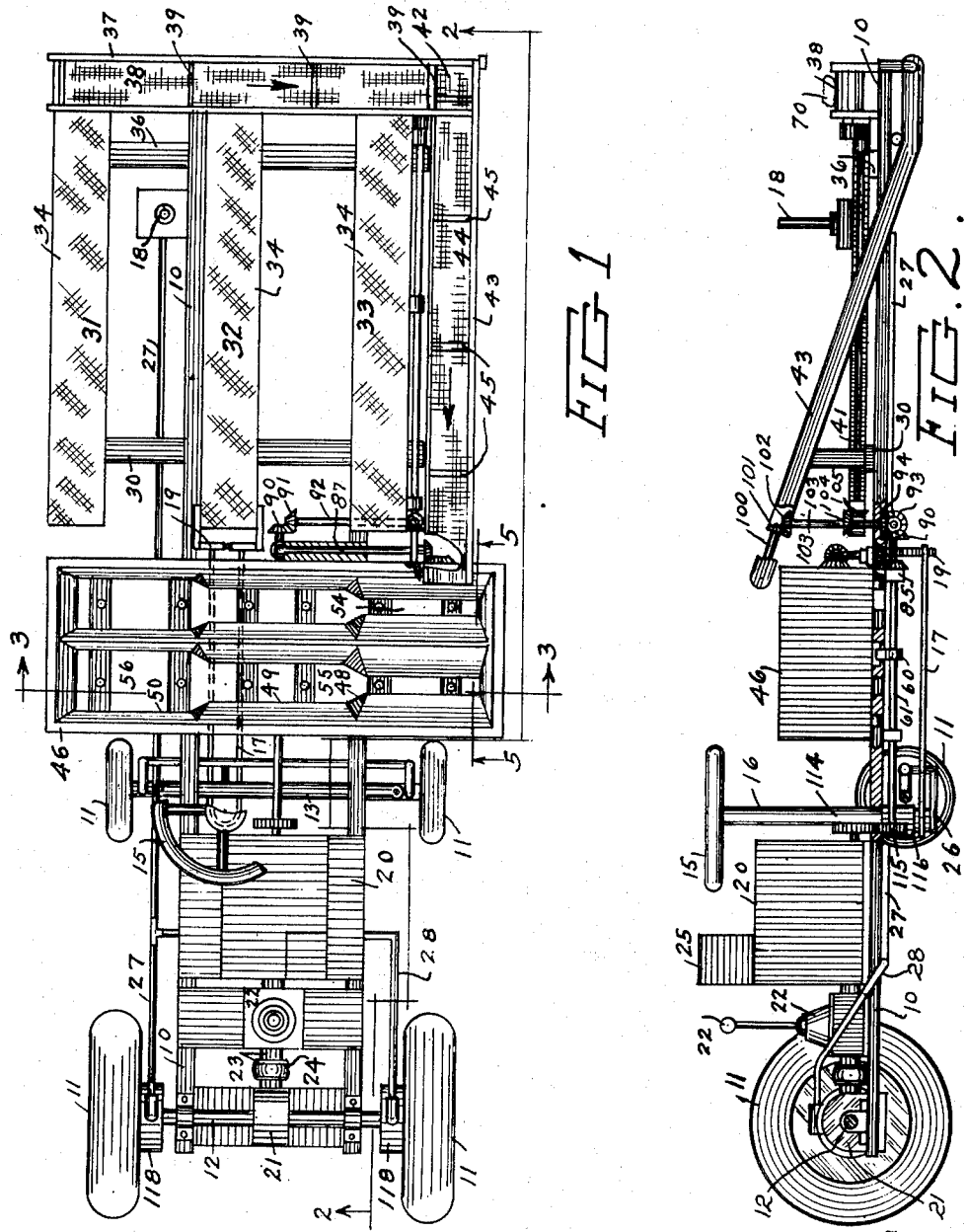

2,536,507

UNITED STATES PATENT OFFICE 2,536,507

AGRICULTURAL PICKER AND ASSORTER

Charles Edwin Lang, Glenarm, Md., Albert Karnemaat and John Jansma, Fremont, Mich., assignors to C. C. Lang & Son, Inc., Baltimore, Md.

Application January 21, 1947, Serial No. 723,332

7 Claims. (Cl. 214—83.1)

This invention relates to agricultural equipment and more particularly to those employable for the hand picking of ground vegetables, especially those of the nature of cucumbers and the like.

It is customary to pick various ground vegetables at ripening by hand labor. The pickers walk on the ground between the rows where the vegetables are located, and bend over to pick them up as they notice them. From the hand they are placed in an apron or basket carried by the pickers which becomes heavy as the picked items pile up therein. The work done by this method is slow and laborious and relatively expensive. Its main objection from the canners point of view, is that it requires a large number of pickers to pick up a certain amount of the vegetables within the limited period of time allowed for their removal from the ground and deposit them where the canners can process them. The physical effects on the pickers are considerable, as the picking requires the bending of the back continuously, which in short while, becomes painful and tiresome, and by the end of the day renders the worker extremely fatigued. The rate of picking is greatly reduced by these effects, after a while.

It is an object of the present invention to provide a new and improved agricultural vehicle for facilitating the picking of vegetables from the ground.

Another object of the invention is to provide a new and improved agricultural vehicle for picking up vegetables from the ground, that will enable hand-picking to be done conveniently; provide for the sorting of the vegetables so picked, and enable the capacity to do such work to be done at a greatly increased rate.

A further object is to provide a new and improved agricultural vehicle for removing vegetables from the ground, by hand, facilitated by mechanism cooperatively operated by mechanical power, which incidently enables sorting and packaging to be included in addition to the picking. At the same time to use the vehicle for carrying the pickers employed and eliminate the effort and the necessity for their walking and bending over to do the picking.

Other objects will become apparent as the invention is more fully set forth.

For a clearer understanding of the invention and the objects thereof, reference is made to the appended drawings and the following description, which together outline a particular form, by way of illustration, while the claims indicate the scope and principles of the invention.

Referring to the drawings:

Figure 1 is a plan view of an agricultural machine for enabling picking of ground vegetables and assorting and grading them, and embodying this invention;

Figure 2 is a side elevation taken along line 2—2 of Figure 1;

Figure 3 is a sectional view taken along line 3—3 of Figure 1;

Figure 4 is a rear view of Figure 1, and

Figure 5 is a sectional view looking along line 5—5 of Figure 1.

Similar reference characters refer to similar parts throughout the drawings.

Briefly the machine consists of a vehicle driven by power, a carrier for human pickers to be employed with the vehicle, and conveyor and sorting mechanism to transfer the vegetables picked, and sort them according to their sizes.

The vehicle employed is that of a conventional chassis 10, supported and running on tired wheels 11, one set of two being arranged on an axle 12, while another set of two are on an axle 13 is guidably operated by a steering mechanism 14. This steering mechanism 14 is operated through the use of a steering wheel 15 and steering column 16, as well as by an auxiliary foot pedal bar 17. The steering wheel is placed above the chassis in its conventional location. The foot pedal bar 17 through the use of pedals 19 is operated close to the end of the stretcher 32 by the feet of a picker. The vehicle is actuated by an internal combustion engine 20 mounted on but above the chassis. It connects with the rear wheel axle 12 and operates the latter through the rear end gears in a housing 21. The engine also has a transmission clutch 22 coupling it to the rear gears through a transmission rod 23. The transmission clutch is arranged for variable speed control of the movement of the vehicle. A universal joint 24 is used if necessary or desirable. Tank 25 is used for supplying fuel to be utilized in the engine 20, and is mounted in a suitable place on the chassis 10. The auxiliary foot pedal bar 17 is connected with the steering mechanism 14 by means of links 26 that operate the mechanism 14 almost as effectively as the steering mechanism through the use of a conventional worm wheel 27 rotated by a worm gear. To do this, the links 26 are attached to steering column 16 so as to rotate it independently of the steering wheel 15. Brakes 118 preferably of the hydraulic type are used with the wheels 11 in the usual manner and applied by a lever mechanism 18 through piping 27 and 28. The carrier used for the pickers to lie prone on, includes preferably three stretcher-like frames 31, 32 and 33, over which canvas mattresses 34 are attached to keep them tensioned, and permit their renewal whenever desirable. The frames 31, 32, and 33 are suspended from extension stringers 39 and 36 attached to the chassis 10. They extend in front of the vehicle chassis 10 so as to carry individuals lying prone on the stretchers. The individuals lie on these stretchers with their heads towards the front end of the frames, where a trough structure 37 is arranged transversely across the vehicle.

The trough structure 37 is used to receive the cucumbers 70 picked up by the hands of the pickers from the ground and thrown into it. There is sufficient space between the frames 31, 32 and 33 to allow the pickers to work their hands in between them and also reach under the stretchers to the ground. For this purpose the frames 31, 32 and 33 are kept suspended over the ground without obstruction about 16" off the ground, as shown in the drawings.

The trough 37 has a transversely disposed conveyor 38 in it, and is of the belt and is preferably provided with slats 39 crosswise on it to propel and carry the cucumbers dropped on it. The belt is endless and runs on pulleys 40, which in turn are turned through a suitable transmission 41. At the end of the travel of this conveyor is located an opening 42 into which the cucumbers are dropped as they come off the conveyor 38. The dropped cucumbers dropped from the conveyor 38 pass through opening 42 which guides them to a secondary conveyor 43. The belt 44 of this conveyor 43 with the help of its crosswise slats 45 carries the cucumbers up an incline along the side of the stretcher frame 33 and dumps them into a shuffle and assorting box 46. The conveyor 43 is similar to the first conveyor 38, with its belt 44 endless, running on the pulleys 44 and operated by a gear 98 connected by gear 95 through shaft 100 to gears 101 and 102 to shaft 103. A gear 104 positioned on shaft 103 through gear 105 drives the transmission shaft 41 so they will operate at approximately the same speed.

The sorter structure consists of the shuffle box 46, mounted slidably on the chassis frame 10 and is preferably of rectangular form. Inside the shuffle box 46 is placed a sorting screen 47 having converging walls 48, 49 and 50 and flat bottoms 52 respectively intended to take care of three sizes of cucumbers connected. Windows or slots 54, 55 and 56 respectively in the bottoms are made to permit the passage of the various sizes of cucumbers arranged for. A partition 57 is erected in the screen 47 to separate it into compartments longitudinally. Underneath the screen 47 is run conveyor belts 58 on which are positioned on pulleys 80 and support slats 81 on which spaced pegs 59 project upwardly through the holes 54, 55 and 56 so as to engage any cucumbers standing still on the screen 47 and moves them along so they will fall through one of the slots, by a bevel gear 85 attached to shaft 61, contacts a gear 86 positioned on shaft 87 and drives a gear 88 which drives gear 89 attached to pulley 80.

A trembler cam 60 rotates on a shaft 61 and periodically contacts a stop 83 attached to the bottom of the screen 47 and slides it quick enough to give it a shaking action and thus keep the cucumbers from sticking.

Three sets of drawers 62, 63 and 64 are placed in the box 46 so as to register under the respective holes 54, 55 and 56, and hold the cucumbers that drop through them. When they are full these drawers are taken out and their contents dumped out and sent to the next processing device. The gear 90 drives a gear 91 attached to shaft 92 and through its gear 93 drives gear 94 attached to shaft 103. The shaft 61 is driven by gears 114 and 115.

Three pickers lie flat on the stretchers so as to raise them above the ground comfortably with their arms reaching down the sides of the frames 31, 32, and 34 as the case may be. The stretchers are narrow enough to allow this. The pickers are carried along as the vehicle travels at slow speed across the ground, and they pick up cucumbers as they pass over same. These cucumbers are dropped into the trough 37, and carried by the conveyor belt 38 to the pan 42 and sent into the secondary conveyor belt 44, which in turn carries them to the shuffle box 46. The shuffle box 46 slides the cucumbers down the converging walls of the screen 47 and allows them to drop through the openings in the bottom according to size. The thicker and longer cucumbers are carried by the pegs 59 of the conveyor 58 to the openings large enough to pass them through. The shaking of the screen 47 by the trembler cam 60 causes the screen to shake the cucumbers sufficiently to make them keep from sticking or allowing them to form a jam. The sorting by the pickers is so convenient that the vehicle can be propelled along the ground at a relatively fast speed as compared with the old walking and bending over method, and yet not be exceptionally tiring. They are so close to the ground that they have little opportunity to miss any of the vegetables. At the same time, the operation of throwing the picked cucumbers into the trough is so simple, and convenient, that it permits speedy picking. The pickers avoid carrying the weight of a quantity of the vegetables and they do not have to bend their backs continuously as heretofore. The conveyors serve to facilitate the transfer of the vegetables from one part of the structure to another automatically, and in the end sort them according to sizes. This saves time and avoids dual handling which are required by the older methods. At the same time one of the operators can control the steering of the vehicle with his feet, avoiding any necessity for stopping the continuity of the picking up work, to do so.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims:

Having thus described the invention; what is claimed is:

We claim:

1. A vehicle of the class described comprising in combination, a propelled vehicle, a frame projecting from said vehicle positioned to come close to the ground while the vehicle travels along, said frame being arranged to hold an individual prone thereon so he can use his arms on either side thereof and have access to vegetables on the ground and means on said vehicle for collecting said vegetables picked up by said individual and means on the vehicle actuable by the individual lying in a prone position for steering said vehicle.

2. A vehicle of the class described comprising in combination, a propelled vehicle, a frame projecting from said vehicle positioned to come close to the ground while the vehicle travels along, said frame being arranged to hold an individual prone thereon so he can use his arms on either side thereof and have access to vegetables on the ground and means on said vehicle for collecting said vegetables picked up by said individual, and thrown by him therein, and means for conveying said vegetables from one part of the vehicle to another and a mechanism on the frame connected with the steering parts of the vehicle and located so as to be operable by the feet of the prone individual for steering the vehicle.

3. A vehicle of the class described comprising in combination, a propelled vehicle, a frame projecting from said vehicle positioned to come close to the ground while the vehicle travels along, said frame being arranged to hold an individual prone thereon so he can use his arms on either side thereof and have access to vegetables on the ground and means on said vehicle for collecting said vegetables picked up by said individual, thrown by him therein, and means for conveying said vegetables from one part of the vehicle to another, and means on the vehicle arranged to receive the vegetables from said last mentioned means and sorting them and a mechanism geared to the vehicle so as to guide same through the use of the feet of said individual lying in a prone position.

4. A vehicle of the class described comprising in combination, a propelled vehicle, a frame projecting from said vehicle positioned to come close to the ground while the vehicle travels along, said frame being arranged to hold an individual prone thereon so he can use his arms on either side thereof and have access to vegetables on the ground and means on said vehicle for collecting said vegetables picked up by said individual, thrown by him therein, and means for conveying said vegetables from one part of the vehicle to another, means on the vehicle arranged to receive the vegetables from said last mentioned means and sorting them, and means for steering the vehicle operated by said individual from his prone position by the manipulation of his feet and independently of his picking efforts by his hands.

5. A vehicle of the class described comprising in combination, a propelled vehicle, a frame projecting from said vehicle positioned to come close to the ground while the vehicle travels along, said frame being arranged to hold an individual prone thereon so he can use his arms on either side thereof and have access to vegetables on the ground and means on said vehicle for collecting said vegetables picked up by said individual, thrown by him therein, and means for conveying said vegetables from one part of the vehicle to another, means on the vehicle arranged to receive the vegetables from said last mentioned means and sorting them, means for steering the vehicle operated by said individual when in prone position and through the use of his feet, and power means for operating the vehicle, and said conveying and sorting means.

6. A vehicle of the class described comprising in combination, a propelled vehicle, a frame projecting from said vehicle positioned to come close to the ground while the vehicle travels along, said frame being arranged to hold an individual prone thereon so he can use his arms on either side thereof and have access to vegetables on the ground and means on said vehicle for collecting said vegetables picked up by said individual, thrown by him therein, and means for conveying said vegetables from one part of the vehicle to another, means on the vehicle arranged to receive the vegetables from said last mentioned means and sorting them, means for steering the vehicle operated by said individual, power means for operating the vehicle, and said conveying and sorting means, said steering means being operable by feet of said individual interlinked with conventional steering mechanism for the vehicle said means being disposed on said frame and operable when said individual is in a prone position.

7. A machine for carrying pickers for picking up cucumbers from a field comprising in combination, a vehicle including chassis, wheels for carrying the chassis and an engine for operating the wheels, a frame extending from the chassis at the rear thereof, stretchers mounted on the frame for workers to lie on in a position for picking up said cucumbers from said field, steering mechanism connected with said wheels with projecting pedals adjacent to said workers so as to be operable thereby in their lying down position, a trough for receiving the cucumbers as delivered by said workers as picked up thereby, a belt for delivering the cucumbers from the trough, a shuffle box for receiving the cucumbers from the belt, and means for sorting the cucumbers in sizes from said box.

CHARLES EDWIN LANG.
ALBERT KARNEMAAT.
JOHN JANSMA.

REFERENCES CITED

The following references are of record in the file of this patent:

UNITED STATES PATENTS

| Number | Name | Date |
|---|---|---|
| 1,504,846 | Tarkington | Aug. 12, 1924 |
| 1,562,929 | Trovaton | Nov. 24, 1925 |
| 2,169,521 | Chong | Aug. 15, 1939 |
| 2,267,234 | Garber | Dec. 23, 1941 |
| 2,317,606 | Harris | Apr. 27, 1943 |
| 2,321,387 | Jackson | June 8, 1943 |
| 2,377,838 | Collings | June 5, 1945 |
| 2,378,847 | Harris | June 19, 1945 |